United States Patent
Nakashima et al.

(10) Patent No.: US 10,977,803 B2
(45) Date of Patent: Apr. 13, 2021

(54) CORRELATION VALUE CALCULATION DEVICE

(71) Applicant: OLYMPUS CORPORATION, Hachioji (JP)

(72) Inventors: Aya Nakashima, Tokyo (JP); Osamu Koshiba, Chiba (JP)

(73) Assignee: OLYMPUS CORPORATION, Tokyo (JP)

( * ) Notice: Subject to any disclaimer, the term of this patent is extended or adjusted under 35 U.S.C. 154(b) by 54 days.

(21) Appl. No.: 16/590,537

(22) Filed: Oct. 2, 2019

(65) Prior Publication Data

US 2020/0034975 A1 Jan. 30, 2020

Related U.S. Application Data

(63) Continuation of application No. PCT/JP2017/014631, filed on Apr. 10, 2017.

(51) Int. Cl.
*G06T 7/223* (2017.01)
*G06T 7/80* (2017.01)
(Continued)

(52) U.S. Cl.
CPC .............. *G06T 7/223* (2017.01); *G06T 5/002* (2013.01); *G06T 5/40* (2013.01); *G06T 7/80* (2017.01)

(58) Field of Classification Search
CPC . G06T 7/223; G06T 7/32; G06T 2207/20224; G06T 5/40; G06T 5/002; G06F 17/15; G06F 17/18
See application file for complete search history.

(56) References Cited

U.S. PATENT DOCUMENTS

2003/0083850 A1* 5/2003 Schmidt .................. G06T 7/001
 702/189
2007/0140591 A1* 6/2007 Kurata ............... H04N 5/23248
 382/278
(Continued)

FOREIGN PATENT DOCUMENTS

CN 106664417 A * 5/2017 ............. G06T 7/174
DE 19549500 C2 * 5/2000 ............. H04N 19/51
(Continued)

OTHER PUBLICATIONS

International Search Report dated Jul. 11, 2017, issued in counterpart International Application No. PCT/JP2017/014631, w/English translation (4 page).

*Primary Examiner* — Charles T Shedrick
(74) *Attorney, Agent, or Firm* — Westerman, Hattori, Daniels & Adrian, LLP

(57) ABSTRACT

A correlation value calculation device for calculating a correlation value between a base block within an image and at least one reference block within the image or other image includes a pixel value distribution calculation unit configured to calculate a pixel value distribution of pixels within the image and select a range of pixel values of a large number of pixels as a valid pixel value range, a conversion coefficient calculation unit configured to calculate conversion coefficients for converting pixels of the valid pixel value range into a prescribed bit-depth, and a pixel value conversion unit configured to perform a bit-depth reduction process on pixels within the base block and pixels within the reference block on the basis of the conversion coefficients.

5 Claims, 6 Drawing Sheets

(51) Int. Cl.
    *G06T 5/00*         (2006.01)
    *G06T 5/40*         (2006.01)

(56)           References Cited

U.S. PATENT DOCUMENTS

| | | |
|---|---|---|
| 2009/0052774 A1 | 2/2009 | Yoshii et al. |
| 2012/0075436 A1* | 3/2012 | Chen ............... H04N 13/161 |
| | | 348/51 |
| 2015/0235103 A1* | 8/2015 | Komatsu .............. G06T 7/593 |
| | | 382/195 |
| 2020/0034960 A1* | 1/2020 | Nakashima ........... H04N 19/43 |
| 2020/0034975 A1* | 1/2020 | Nakashima ............. G06T 7/32 |

FOREIGN PATENT DOCUMENTS

| | | | |
|---|---|---|---|
| EP | 1793346 A2 * | 6/2007 | ............ G06T 7/223 |
| JP | 2-19070 A | 1/1990 | |
| JP | 10-222669 A | 8/1998 | |
| JP | 2008-154251 A | 7/2008 | |
| JP | 2008-287605 A | 11/2008 | |
| WO | WO-2017017742 A1 * | 2/2017 | ............ H04N 5/217 |

* cited by examiner

CORRELATION VALUE CALCULATION DEVICE

FIELD OF THE INVENTION

The present invention relates to a correlation value calculation device for calculating a correlation value between images. This application is a continuation application based on a PCT International Application No. PCT/JP2017/014631. The content of the PCT International Application is incorporated herein by reference.

DESCRIPTION OF RELATED ART

In a noise reduction process, motion vector detection, and the like in image processing, correlation value calculation between images is often performed. The correlation value indicates a degree of similarity between images. A correlation value between two images (in which one image is referred to as a base frame and the other image is referred to as a reference frame) is calculated from a difference between pixel values of pixels at the same position or the like between a specific region (a base block) in the base frame and a specific region (a reference block) within a reference frame having the same block size as the base block. For the correlation value calculation, a calculation method based on a sum of absolute differences (SAD), the sum of squared differences (SSD), or the like is known.

In the noise reduction process, the motion vector detection, and the like, it is necessary to perform the correlation value calculation at a high speed. Thus, a dedicated circuit (a correlation value calculation device) configured to perform the correlation value calculation is normally provided in a device for performing the noise reduction process, the motion vector detection, or the like.

With high resolution of an image that is a correlation value calculation target, the number of bits per pixel unit increases and the circuit scale of the correlation value calculation device increases. There is a need for reducing an increasing circuit scale without reducing the speed of correlation value calculation of the correlation value calculation device.

Japanese Unexamined Patent Application, First Publication No. 1110-222669 describes an aligning device configured to perform a matching process by a low-resolution image subjected to a bit-depth reduction process of reducing the number of bits per pixel unit on the basis of a pixel value distribution of the image. The aligning device can reduce a circuit scale of the matching process and perform the matching process at a high speed by using the low-resolution image subjected to the bit-depth reduction process.

SUMMARY OF THE INVENTION

According to a first aspect of the present invention, there is provided a correlation value calculation device for calculating a correlation value between a base block within an image and at least one reference block within the image or other image, the correlation value calculation device including: a pixel value distribution calculation unit configured to calculate a pixel value distribution of pixels within the image and select a range of pixel values of a large number of pixels as a valid pixel value range; a conversion coefficient calculation unit configured to calculate conversion coefficients for converting pixels of the valid pixel value range into a prescribed bit-depth; and a pixel value conversion unit configured to perform a bit-depth reduction process on pixels within the base block and pixels within the reference block on the basis of the conversion coefficients.

DETAILED DESCRIPTION OF THE INVENTION

An embodiment of a correlation value calculation device of the present invention will be described with reference to FIGS. 1 to 7.

A correlation value calculation device 100 according to the present embodiment is mounted in a device configured to perform a noise reduction process, motion vector detection, and the like to calculate correlation values at a high speed.

Figure 1:
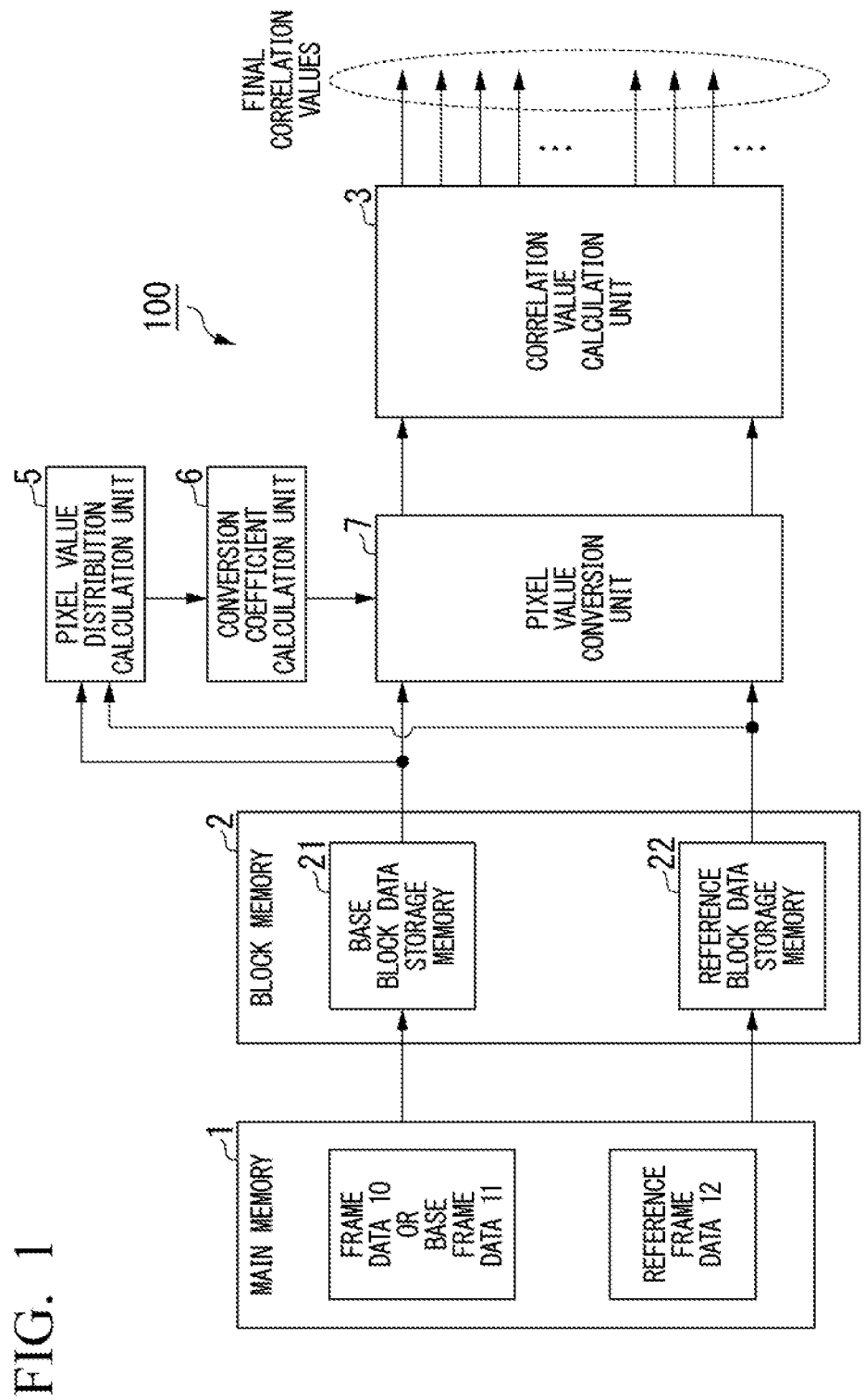
FIG. 1 is a diagram showing a correlation value calculation device according to an embodiment of the present invention.

FIG. 1 is a diagram showing a configuration of the correlation value calculation device 100. The correlation value calculation device 100 calculates a correlation value between a specific region (a base block) and a specific region (a reference block) within one image (frame). The specific region has the same block size as the base block.

Figure 2:
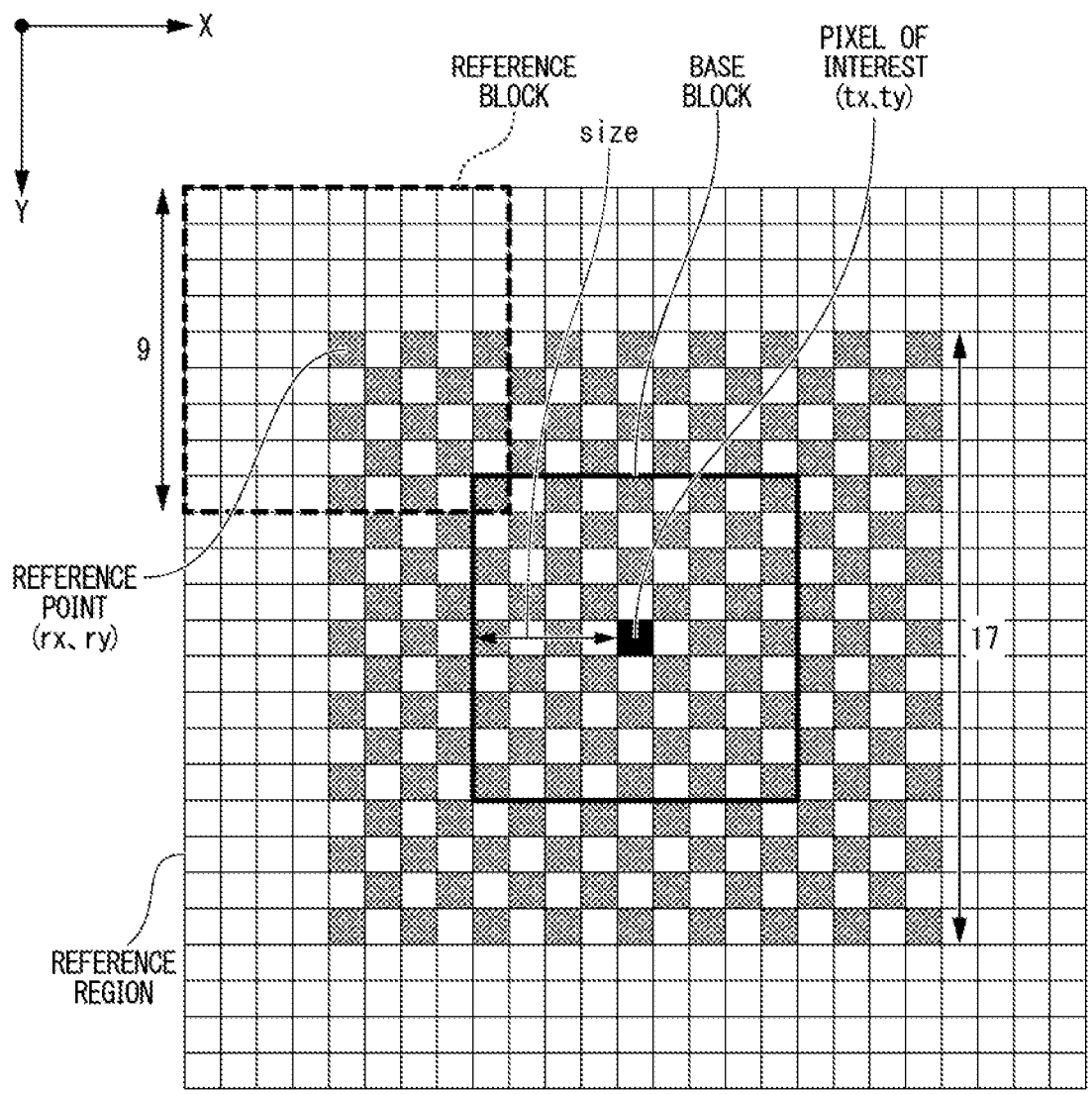
FIG. 2 is a diagram showing a relationship between a base block and a reference block.

As shown in FIG. 2, the correlation value calculation device 100 of the present embodiment calculates a correlation value between a base block whose central pixel is set as a pixel of interest (tx, ty) of an image (a frame) and at least one reference block.

In the following description, XY coordinates are used to describe positions of pixels of the image. As shown in FIG. 2, the horizontal direction is defined as an X-axis direction, the vertical direction is defined as a Y-axis direction, and an upper-left point is defined as the origin. The XY coordinates are represented as (X, Y)=(0, 0).

The correlation value calculation device 100 includes a main memory 1, a block memory 2, a correlation value calculation unit 3, a pixel value distribution calculation unit 5, a conversion coefficient calculation unit 6, and a pixel value conversion unit 7.

The main memory 1 includes a dynamic random access memory (DRAM) or the like and stores image data (frame data 10) that is a correlation value calculation target. Here, the frame data 10 is divided into a plurality of base blocks.

The correlation value calculation device 100 may calculate a correlation value at a high speed between a specific region (a base block) within a base frame and a specific region (a reference block) within a reference frame having the same block size as the base frame in two images (in which one image is referred to as the base frame and the other image is referred to as the reference frame).

When the correlation value calculation device 100 calculates the correlation value between the two images (the base frame and the reference frame), the main memory 1 stores both base frame data 11 and reference frame data 12.

The block memory 2 is a memory for storing data of the base block and the reference block which are the correlation value calculation target and includes a base block data storage memory 21 and a reference block data storage memory 22.

The base block data storage memory 21 includes a static random access memory (SRAM), a register file, or the like and stores data of at least one base block in the frame data 10 stored in the main memory 1. The data of the base block is read from the main memory 1 by a CPU (not shown) or the like and transferred to the base block data storage memory 21.

The reference block data storage memory 22 includes an SRAM, a register file, and the like and stores data of a plurality of reference blocks within the frame data 10 stored in the main memory 1. The data of the reference block is read from the main memory 1 by the CPU (not shown) or the like and transferred to the reference block data storage memory 22.

In the frame data 10, as shown in FIG. 2, reference points (reference pixels) are 144 pixels obtained by excluding a pixel of interest from pixels arranged in a checkered pattern in a region whose central pixel is set to the pixel of interest and which includes 17 pixels in the horizontal direction and 17 pixels in the vertical direction (hereinafter referred to as "17×17"). The reference block data storage memory 22 stores data of a region (a reference region) including 144 reference blocks whose central pixels are set to reference points (rx, ry).

Here, because a block whose central pixel is set to the pixel of interest is the base block itself, the block is excluded from a calculation target for a correlation value with the base block.

Here, the arrangement of the reference points in the checkered pattern means that pixels which are reference points and pixels which are not reference points are alternately arranged every pixel in the horizontal direction and the vertical direction.

The block size of the base block and the reference block is a block size (9×9) as shown in FIG. 2.

The data stored in either the base block or the reference block is data of 12 bits per pixel. The data may be monochrome or color data or may be intermediate data from an image sensor.

The correlation value calculation unit 3 calculates the correlation value between the base block and the reference block.

Figure 3:
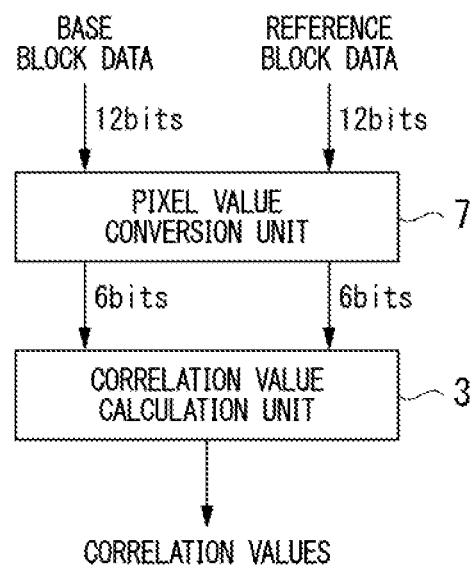
FIG. 3 is a diagram showing a data flow in a bit-depth reduction process of a pixel value conversion unit in the correlation value calculation device according to the embodiment of the present invention.

FIG. 3 is a diagram showing a data flow of a bit-depth reduction process of the pixel value conversion unit 7 to be described below. As shown in FIG. 3, pixel data of the base block and pixel data of the reference block having data of 12 bits per pixel are subjected to the bit-depth reduction process of the pixel value conversion unit 7 and are converted into pixel data having 6 bits per pixel. Data of a generated low-resolution image is transferred to the correlation value calculation unit 3. The correlation value calculation unit 3 calculates a correlation value from pixel data of a base block and pixel data of a reference block having data of 6 bits per pixel.

The correlation value calculation unit 3 is a circuit configured to calculate 144 correlation values between one base block and 144 reference blocks.

Data of one base block stored in the base block data storage memory 21 and data of 144 reference blocks stored in the reference block data storage memory 22 are input via the pixel value conversion unit 7 to be described below.

The correlation value calculation unit 3 may be configured to calculate the 144 correlation values in parallel or may be configured to calculate the 144 correlation values in a time-division manner.

The correlation value calculation unit 3 calculates a sum of absolute differences (SAD) as the correlation value. The SAD at a reference point (rx, ry) is calculated by the following Eq. 1.

[Math. 1]

$$sad(rx, ry) = \sum_{-size \leq i, j \leq size} |image(tz + i, ty + j) - image(rx + i, ry + j)| \quad \text{Eq. 1}$$

In Eq. 1, image(x, y) is pixel data of an image (the frame data 10) at XY coordinates (x, y). Either monochrome or color data may be used, or intermediate data from an image sensor may be used. Size indicates ((the number of pixels from the central pixel to the endmost pixel)−1).

The calculation of the correlation values between the base block and the reference block may be collectively calculated for the block or may be calculated by calculating a correlation value for one line of the block and accumulating and summing calculated correlation values for lines.

The pixel value distribution calculation unit 5 is a circuit configured to calculate a pixel value distribution from a base frame that is a correlation value calculation target. The pixel value distribution calculation unit 5 of the present embodiment calculates a histogram as the pixel value distribution. The pixel value conversion unit 7 to be described below performs a bit-depth reduction process to generate a low-resolution image that is a correlation value calculation target on the basis of the histogram calculated by the pixel value distribution calculation unit 5.

Figure 4:
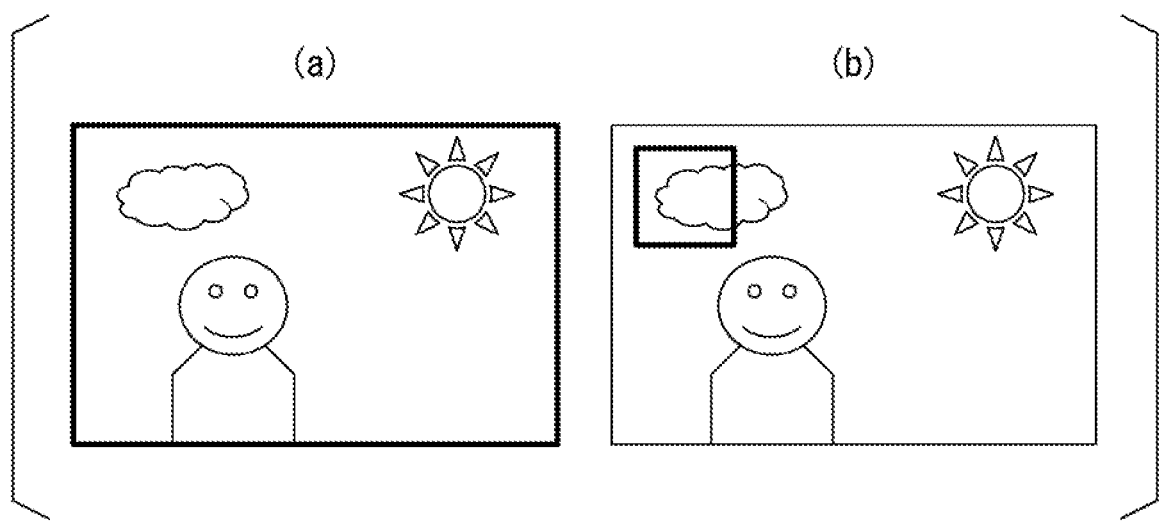
FIG. 4 is a diagram showing a calculation target region of a histogram calculated by a pixel value distribution calculation unit in the correlation value calculation device according to the embodiment of the present invention.

FIG. 4 is a diagram showing a calculation target region of a histogram calculated by the pixel value distribution calculation unit 5. In the diagram illustrated in FIG. 4(a), the entire image of a base frame is set as the calculation target region of the histogram. In the diagram illustrated in FIG. 4(b), only a base block of the base frame is set as the calculation target region of the histogram.

Although the calculation target region of the histogram may be the entire image of the base frame or only the base block, the pixel value distribution calculation unit 5 of the present embodiment calculates a histogram, which is a pixel value distribution, from only the data of the base block as shown in FIG. 4(b).

The correlation value calculation obtains a degree of similarity between local images on the basis of image characteristics in local image regions such as the base block and the reference block.

Thus, when a low-resolution image subjected to the bit-depth reduction process is used in the correlation value calculation, it is preferable to generate the low-resolution image so that a local pixel value distribution trend is maintained instead of a pixel value distribution trend of the entire image of the base frame. Consequently, it is preferable that the local pixel value distribution trend be ascertained by the histogram used to generate the low-resolution image.

Therefore, in the present embodiment, the histogram which is the pixel value distribution is calculated only from the data of the base block stored in the block memory.

Also, the pixel value distribution calculation unit 5 may calculate the histogram by adding the data of the reference block to the data of the base block. The pixel value distribution calculation unit 5 can calculate the histogram which additionally ensures the local pixel value distribution trend by using the data of both the base block and the reference block that are the correlation value calculation target.

The pixel value distribution calculation unit 5 reads data of all 81 pixels of the base block having a block size (9×9) and calculates a histogram by counting the number of pixels for each 12-bit depth (pixel value). Here, the number of pixels may not be counted for every 12-bit depth. For example, the histogram may be calculated by discarding 4 less-sigificant bits of the pixel value and counting the number of pixels for each 8-bit depth (pixel value). Even in this method, it is possible to ascertain the pixel value distribution trend and reduce the circuit scale for histogram calculation.

The pixel value distribution calculation unit 5 identifies a valid pixel value range including a characteristic pixel value distribution from a result of calculating the histogram together with the calculation of the histogram. In the present embodiment, the pixel value distribution calculation unit 5 calculates an upper-limit value hist_high and a lower-limit value hist_low of the valid pixel value range from the calculated histogram. A range between the upper-limit value hist_high and the lower-limit value hist_low is defined as a valid pixel value range.

Figure 5:
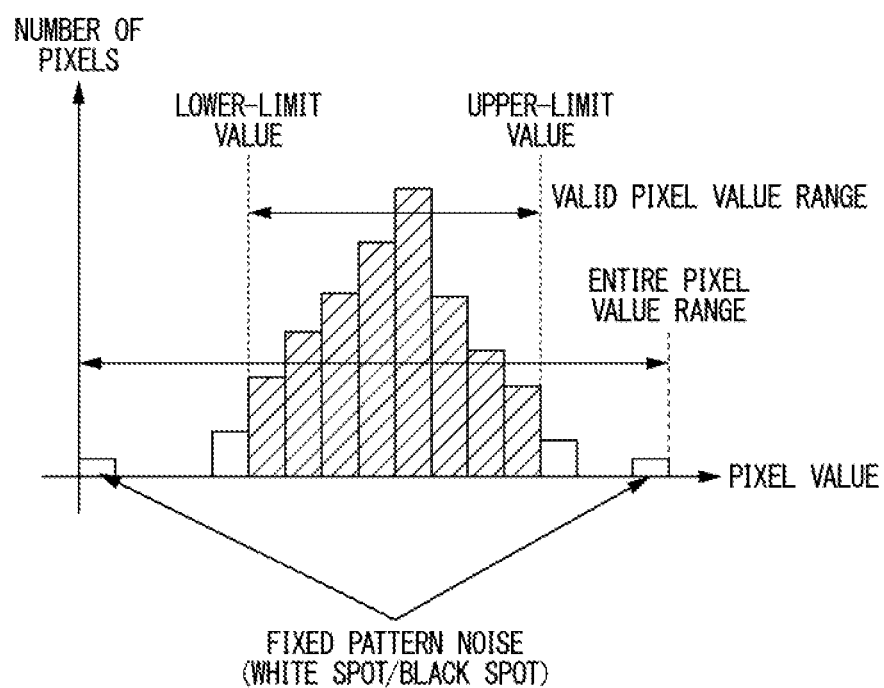
FIG. 5 is a diagram showing the histogram calculated by the pixel value distribution calculation unit in the correlation value calculation device according to the embodiment of the present invention.

FIG. 5 shows the histogram, the upper-limit value hist_high, and the lower-limit value hist_low calculated by the pixel value distribution calculation unit 5. In the prior art, a bit-depth reduction process is performed on pixels of the entire pixel value range from the maximum value (white) to the minimum value (black) of pixel values in the histogram and a low-resolution image that is a correlation value calculation target is generated.

On the other hand, as shown in FIG. 5, the correlation value calculation device 100 according to the present embodiment sets the range from the upper-limit value hist_high to the lower-limit value hist_low of the pixel values in the histogram as the valid pixel value range, performs the bit-depth reduction process on the pixels of the valid pixel value range, and generates the low-resolution image that is the correlation value calculation target.

The image data of a normal natural image has a large number of pixels near a median value of pixel values in the histogram as shown in FIG. 5 and the number of pixels which are close to the maximum value (white) or the minimum value (black) in the histogram tends to decrease. The pixel value range with a small number of pixels does not include a characteristic pixel value distribution of the image in many cases as compared with the pixel value range with a large number of pixels.

Therefore, as shown in FIG. 5, the pixel value distribution calculation unit 5 of the present embodiment sets the valid pixel value range to a range obtained by excluding a range which is predicted to have a small number of pixels and which is close to the maximum value (white) and the minimum value (black) of the pixel values.

The upper-limit value hist_high is set to a largest pixel value among the remaining pixels after HIST_HIGH_NUM pixels are excluded in order from the pixel with the largest pixel value among all the pixels used for the histogram calculation.

The lower-limit value hist_low is set to a smallest pixel value among the remaining pixels after HIST_LOW_NUM pixels are excluded in order from the pixel with the smallest pixel value among all the pixels used for the histogram calculation.

HIST_HIGH_NUM and HIST_LOW_NUM can be changed by software settings.

Some of the pixel data is lost by excluding a certain number of pixels from the pixel value distribution range. However, because the purpose of correlation value calculation is to determine the degree of similarity between a base block and a reference block, difference information between pixels having similar pixel values becomes important. Accordingly, a small number of pixels having pixel values distributed around the maximum value and the minimum value of the pixel distribution range are pixels of low importance in the determination of similarity and are considered to have a low influence on the determination of similarity.

The upper-limit value hist_high and the lower-limit value hist_low may be selected in consideration of influences of random noise and fixed pattern noise included in the image.

In particular, the fixed pattern noise tends to have the maximum value (white) and the minimum value (black) of pixel values as shown in FIG. 5. Thus, it is difficult to select a valid pixel value range robust to fixed pattern noise only by setting the valid pixel value range to a range obtained by excluding a certain pixel value range from the maximum value and the minimum value of the pixel value distribution range.

It is possible to select a valid pixel value range robust to fixed pattern noise by excluding a certain number of pixels having large pixel values and a certain number of pixels having small pixel values as in the pixel value distribution calculation unit 5 of the present embodiment.

The upper-limit value hist_high and the lower-limit value hist_low may be calculated on the basis of a rate of occurrence of fixed pattern noise estimated from the photographing conditions (ISO sensitivity, shutter speed, temperature, and the like). The estimated number of pixels of fixed pattern noise related to the number of pixels used for histogram calculation is calculated from the number of pixels of the image and the number of times the fixed pattern noise occurs and a range obtained by excluding the estimated number of pixels is set as the valid pixel value range.

When the number of pixels of an image is set to PIX_NUM, the number of times fixed pattern noise of a black spot occurs is set to FIXED_LOW_NUM, and the number of times fixed pattern noise of a white spot occurs is set to FIXED_HIGH_NUM, the estimated number of pixels HIST_LOW_NUM of fixed pattern noise of the black spot related to the number of pixels HIST_NUM used for histogram calculation is calculated by the following Eq. 2 and the estimated number of pixels HIST_HIGH_NUM of fixed pattern noise of the white spot related thereto is calculated by the following Eq. 3.

[Math. 2]

$$\text{HIST\_LOW\_NUM} = \frac{\text{FIXED\_LOW\_NUM}}{\text{PIX\_NUM}} \times \text{HIST\_NUM} \quad \text{Eq. 2}$$

[Math. 3]

$$\text{HIST\_HIGH\_NUM} = \frac{\text{FIXED\_HIGH\_NUM}}{\text{PIX\_NUM}} \times \text{HIST\_NUM} \quad \text{Eq. 3}$$

The conversion coefficient calculation unit 6 calculates conversion coefficients for converting pixels in the valid pixel value range selected by the pixel value distribution calculation unit 5 into a prescribed bit-depth.

The conversion coefficient calculation unit 6 calculates an amount of subtraction "offset" of the pixel value and an amount of shift "shift" as the conversion coefficients. When the bit-depth after the bit-depth reduction process is set to 6 bits, the amount of subtraction "offset" of the pixel value and the amount of shift "shift" are calculated as follows.

First, as shown in the following Eq. 4, the subtraction amount "offset" of the pixel value is set to the lower-limit value hist_low calculated by the pixel value distribution calculation unit 5.

[Math. 4]

$$\text{offset} = \text{hist\_low} \quad \text{Eq. 4}$$

Next, as shown in the following Eq. 5 the valid pixel value range "range" is calculated from the upper-limit value hist_high and the lower-limit value hist_low.

[Math. 5]

$$\text{range} = \text{hist\_high} - \text{hist\_low} \quad \text{Eq. 5}$$

Finally, as shown in the following Eq. 6, the amount of shift "shift" is calculated from the bit-depth (6 bits) after the bit-depth reduction process and the valid pixel value range "range".

[Math. 6]

$$\text{shift} = \begin{bmatrix} 0 & (\text{range} < 2^6) \\ 1 & (2^6 \leq \text{range} \,\&\&\, \text{range} < 2^{6+1}) \\ 2 & (2^{6+1} \leq \text{range} \,\&\&\, \text{range} < 2^{6+2}) \\ \ldots & \ldots \end{bmatrix} \quad \text{Eq. 6}$$

When the image data has a negative value, the amount of shift "shift" may be calculated to have a negative value as shown in the following Eq. 7.

[Math. 7]

$$\text{shift} = \begin{cases} -3 & (\text{range} < 2^{6+5}) \\ -2 & (2^{6-3} \leq \text{range} \,\&\&\, \text{range} < 2^{6+4}) \\ -1 & (2^{6-2} \leq \text{range} \,\&\&\, \text{range} < 2^{6+3}) \\ 0 & (2^{6-1} \leq \text{range} \,\&\&\, \text{range} < 2^{6+2}) \\ 1 & (2^6 \leq \text{range} \,\&\&\, \text{range} < 2^{6+1}) \\ 2 & (2^{6+1} \leq \text{range} \,\&\&\, \text{range} < 2^{6+2}) \\ \ldots & \ldots \end{cases} \quad \text{Eq. 7}$$

The pixel value conversion unit 7 performs the bit-depth reduction process on data of the base block and the reference block and generates a low-resolution image that is a correlation value calculation target on the basis of the conversion coefficients calculated by the conversion coefficient calculation unit 6. Data of the generated low-resolution image is transferred to the correlation value calculation unit 3.

The block size of the base block and the reference block between which a correlation value is calculated is set to BLOCK_SIZE, a pixel value of the base block is set to base_block[i][j], and a pixel value of the reference block is set to reference_block[i][j]. Here, [i][j] denotes a pixel having an X coordinate of i and a Y coordinate of j.

First, as shown in the following Eqs. 8, base_offset[i][j] and reference_offset[i][j] are calculated by subtracting "offset" calculated by the conversion coefficient calculation unit 6 from base_block[i][j] and reference_block[i][j].

[Math. 8]

$$\text{base\_offset}[i][j] = \text{base\_block}[i][j] - \text{offset}$$

$$\text{reference\_offset}[i][j] = \text{reference\_block}[i][j] - \text{offset}$$
$$(0 \leq i,j < \text{BLOCK\_SIZE}) \quad \text{Eqs. 8}$$

Next, as shown in following Eqs. 9, base_shift[i][j] and reference_shift[i][j] are calculated by right-shifting (logically shifting) base_offset[i][j] and reference_offset[i][j] by the amount of shift "shift" calculated by the conversion coefficient calculation unit 6.

[Math. 9]

$$\text{base\_shift}[i][j] = \text{base\_offset}[i][j] \gg \text{shift}$$

$$\text{reference\_shift}[i][j] = \text{reference\_offset}[i][j] \gg \text{shift}$$
$$(0 \leq i,j < \text{BLOCK\_SIZE}) \quad \text{Eqs. 9}$$

Finally, as shown in the following Eqs. 10, base_out[i][j] and reference_out[i][j] which are outputs of the pixel value conversion unit 7 are calculated by clipping base_shift[i][j] and reference_shift[i][j] at the maximum value of 6 bits, which is the bit-depth after the bit-depth reduction process.

[Math. 10]

$$\text{base\_out}[i][j] = \begin{cases} 0 & (\text{base\_shift}[i][j] < 0) \\ 2^6 - 1 & (\text{base\_shift}[i][j] > 2^6 - 1) \\ \text{base\_shift}[i][j] & (\text{others}) \end{cases} \quad \text{Eqs. 10}$$

$$\text{reference\_out}[i][j] =$$
$$\begin{cases} 0 & (\text{reference\_shift}[i][j] < 0) \\ 2^6 - 1 & (\text{reference\_shift}[i][j] > 2^6 - 1) \\ \text{reference\_shift}[i][j] & (\text{others}) \end{cases}$$

$$(0 \leq i, j < \text{BLOCK\_SIZE})$$

Next, an operation of the correlation value calculation device 100 will be described.

First, target frame data 10 is stored in the main memory 1. Even if all the frame data 10 is not stored in the main memory 1, the correlation value calculation of a target block may be sequentially performed at a point in time when the data of the base block of the correlation value calculation target and the data of the reference block are stored in the main memory 1.

The data of the base block that is the calculation target is sequentially stored in the base block data storage memory 21. Also, the data of the reference block of the reference region corresponding to the base block that is the calculation target is stored in the reference block data storage memory 22.

At a point in time when the data of the base block that is the calculation target has been stored in the base block data storage memory 21, the pixel value distribution calculation unit 5 calculates the histogram, the upper-limit value hist_high, and the lower-limit value hist_low. Calculation results are transferred to the conversion coefficient calculation unit 6. The conversion coefficient calculation unit 6 calculates the conversion coefficients.

The pixel value conversion unit 7 performs the bit-depth reduction process on data of the base block and the reference block and generates a low-resolution image that is a correlation value calculation target on the basis of the conversion coefficients calculated by the conversion coefficient calculation unit 6. The pixel value conversion unit 7 generates a low-resolution image having 6 bits per pixel from data of a base block having 12 bits per pixel. Also, likewise, the pixel value conversion unit 7 generates a low-resolution image having 6 bits per pixel from data of a reference block having 12 bits per pixel.

After the low-resolution image is generated, the correlation value calculation unit 3 starts the calculation of the correlation value of the target block. The correlation value calculation unit 3 outputs a result of the correlation value calculation to, for example, a motion vector detection device or the like.

After the above-described process on one base block is completed, a similar process is sequentially iterated for the next base block and the correlation value calculation is performed on all the frame data 10.

The correlation value calculation device 100 performs histogram calculation every time the base block is updated.

The correlation value calculation device 100 of the present embodiment identifies a valid pixel value range including a characteristic pixel value distribution, performs a bit-depth reduction process on pixels of the valid pixel value range, and generates a low-resolution image that is a correlation value calculation target. The correlation value calculation device 100 can use a low-resolution image in which the image characteristics are maintained as much as possible for correlation value calculation, can reduce the circuit scale of correlation value calculation, and can perform the correlation value calculation at a high speed.

The correlation value calculation device 100 of the present embodiment calculates a histogram as a pixel value distribution and sets the valid pixel value range to a range obtained by excluding a range which is predicted to have a small number of pixels and which is close to the maximum value (white) and the minimum value (black) of the pixel values. The valid pixel value range can be selected on the basis of an accurate pixel value distribution.

Also, the correlation value calculation device 100 of the present embodiment can select a valid pixel value range robust to noise or the like by excluding a certain number of pixels having large pixel values and a certain number of pixels having small pixel values from the valid pixel value range. The valid pixel value range can be selected on the basis of the accurate pixel value distribution.

Also, the correlation value calculation device 100 of the present embodiment calculates a histogram that is a pixel value distribution from only the data of the base block stored in the block memory. Thus, in the correlation value calculation, it is possible to use the low-resolution image in which a local pixel value distribution trend is maintained instead of a pixel value distribution trend of the entire image of the base frame and to obtain a degree of similarity between local images on the basis of image characteristics in a local image region.

In the correlation value calculation device 100 of the present embodiment, when the correlation value calculation unit 3 is configured to calculate 144 correlation values in parallel, the correlation value calculation unit 3 configured to perform correlation value calculation in a 6-bit depth can reduce the circuit scale to about half as compared with a correlation value calculation unit configured to perform correlation value calculation in a 12-bit depth. The circuit scale of the pixel value distribution calculation unit 5, the conversion coefficient calculation unit 6, and the pixel value conversion unit 7 necessary to generate a low-resolution image is sufficiently small as compared with the reduced circuit scale of the correlation value calculation unit 3. Thus, the correlation value calculation device 100 of the present embodiment can reduce the circuit scale as a whole.

Although the embodiment of the present invention has been described above in detail with reference to the drawings, the specific configuration is not limited to the embodiment and design changes and the like within the spirit and scope of the present invention are also included. Also, a configuration can be made by appropriately combining components shown in the above-described embodiment and modified examples to be described below.

Modified Example 1

For example, although the correlation value calculation device 100 of the above-described embodiment is a circuit configured to calculate a sum of absolute differences (SAD) as a correlation value, the correlation value is not limited thereto. For example, the correlation value may be a sum of squared differences (SSD), a value of normalized cross-correlation (NCC), a value of zero-mean normalized cross-correlation (ZNCC), or the like.

Modified Example 2

Although the block size is 9×9 in the above-described embodiment, the block size is not limited thereto. For example, the block size may be a block size such as 16×16, 15×15, 5×5, or 3×3 or may be a block size (15×9).

Modified Example 3

Also, although the conversion coefficient calculation unit 6 of the correlation value calculation device 100 of the above-described embodiment uses the amount of subtraction "offset" and the amount of shift "shift" as conversion coefficients for converting pixel data into a prescribed bit-depth, conversion coefficients to be calculated are not limited thereto. For example, base_out[i][j] and reference_out[i][j] which are the outputs of the pixel value conversion unit 7 may be obtained by a linear function as shown in the following Eqs. 11.

[Math. 11]

$$\text{base\_out}[i][j] = a \times (\text{base\_block}[i][j] + b)$$

$$\text{reference\_out}[i][j] = a \times (\text{reference\_block}[i][j] + b)$$

$$(0 \leq i,j < \text{BLOCK\_SIZE}) \qquad \text{Eqs. 11}$$

In this case, it is only necessary for the conversion coefficient calculation unit 6 to calculate a slope a and an intercept b of the above-described linear function as the conversion coefficients. When the bit-depth after the bit-depth reduction process is set, to 6 bits, the intercept b is set to the lower-limit value hist_low calculated by the pixel value distribution calculation unit 5 as shown in the following Eq. 12.

[Math. 12]

$$b = -\text{hist\_low} \qquad \text{Eq. 12}$$

Next, the valid pixel value range range is calculated from Eq. 5 as in the above-described embodiment. Finally, as shown in the following Eq. 13, the slope a is obtained from the bit-depth (6 bits) after the bit-depth reduction process and the valid pixel value range "range".

[Math. 13]

$$a = \begin{cases} \dfrac{1 << 6}{\text{range}} & (\text{range} \neq 0) \\ 0 & (\text{others}) \end{cases} \qquad \text{Eq. 13}$$

Modified Example 4

Also, although the pixel value distribution calculation unit 5 of the above-described embodiment calculates one type of histogram as a pixel value distribution from a base frame which is a correlation value calculation target, a histogram calculation mode is not limited thereto. For example, when the image data includes a plurality of elements such as RGB and YUV, a histogram may be calculated for each constituent element of the image data.

Figure 6:
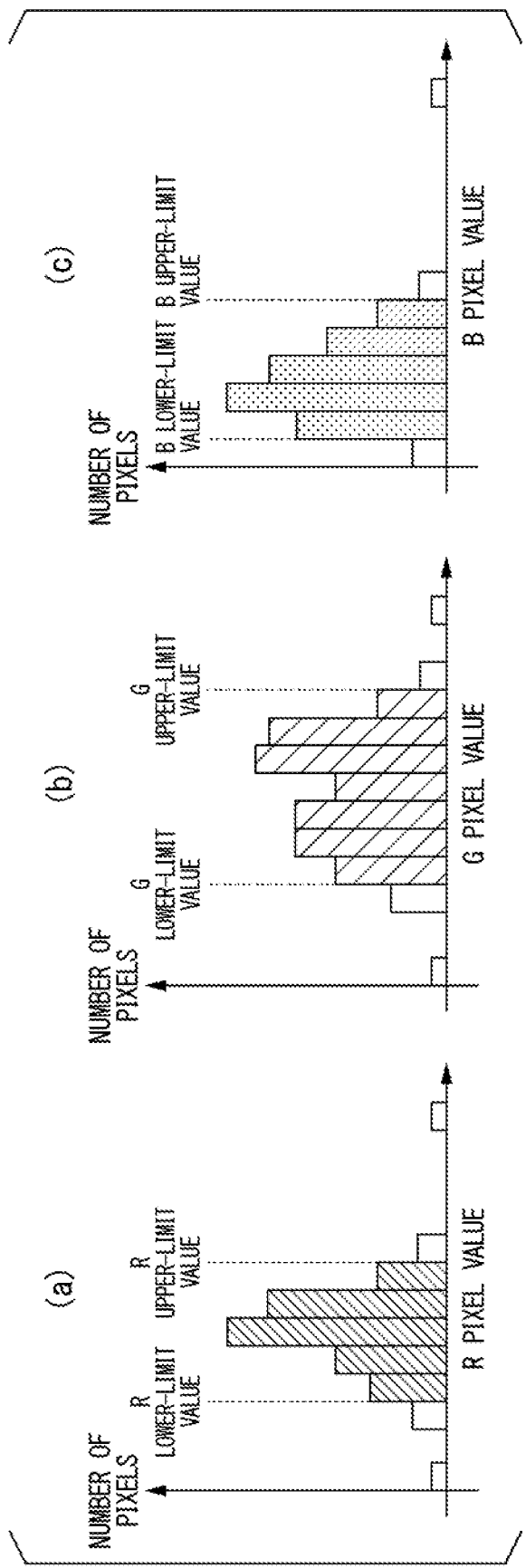
FIG. 6 is a diagram showing histograms for respective elements of RGB calculated in a modified example of the pixel value distribution calculation unit in the correlation value calculation device according to the embodiment of the present invention.

FIG. 6 shows histograms generated for respective elements of RGB in the pixel value distribution calculation unit when image data includes the respective elements of RGB. The pixel value distribution calculation unit ascertains a pixel value distribution trend for each element of RGB and calculates an upper-limit value and a lower-limit value for each element of RGB. The conversion coefficient calculation unit calculates a conversion coefficient for each element of RGB and the pixel value conversion unit performs a bit-depth reduction process for each element of RGB to generate a low-resolution image. By performing histogram calculation, conversion coefficient calculation, and a bit-depth reduction process for each element of RGB, the correlation value calculation device 100 can more preferably generate a low-resolution image in which image characteristics are maintained and use the generated low-resolution image for correlation value calculation.

Modified Example 5

Also, the pixel value distribution calculation unit 5 of the above-described embodiment sets the valid pixel value range to a range obtained by excluding a range which is predicted to have a small number of pixels and which is close to the maximum value (white) and the minimum value (black) of the pixel values. However, a valid pixel value range setting mode is not limited thereto. For example, the valid pixel range may be set by ascertaining positions of peaks in the number of pixels and the number of peaks in a pixel value distribution.

Figure 7:
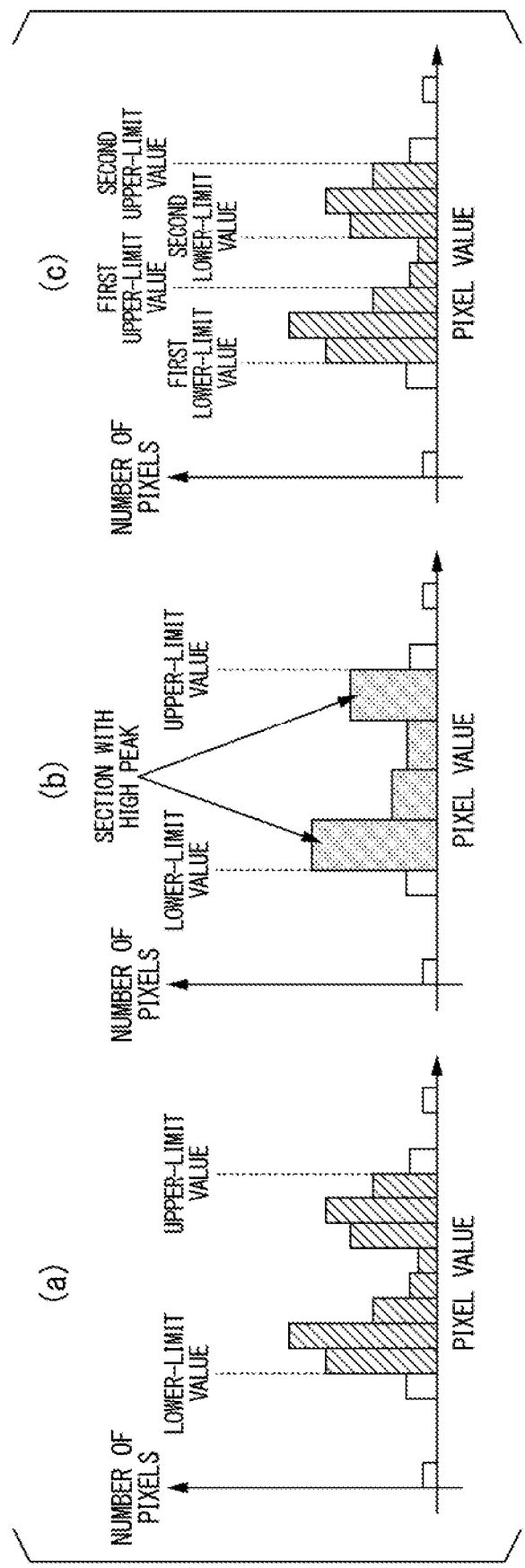
FIG. 7 is a diagram showing histograms calculated in a modified example of the pixel value distribution calculation unit in the correlation value calculation device according to the embodiment of the present invention.

FIG. 7 shows histograms in which the number of peaks in the number of pixels in the pixel value distribution is two. In an image including a boundary of a physical object or the like, the number of peaks in the number of pixels in the pixel value distribution of the histogram is often two or more as shown in FIG. 7(*a*).

When the peaks are separated, a pixel value having a small number of pixels between peaks falls within the valid pixel value range and the pixel value is included in the bit-depth after the bit-depth reduction process.

The setting of the valid pixel value range as described above is not preferable from the viewpoint at which a range of pixel values having a large number of pixels is selected as a valid pixel value range, a bit-depth reduction process is performed on the pixels of the valid pixel value range, and a low-resolution image in which image characteristics can be maintained as much as possible is generated.

Therefore, as shown in FIG. 7(*b*), a range between an upper-limit value and a lower-limit value which are temporarily set is subdivided into four sections and a distance between the two sections having a highest peak is calculated. When the sections are not adjacent to each other and when the number of pixels within a threshold value is present in each section between the sections as shown in FIG. 7(*c*), it is determined that there are two peaks and the upper-limit value and the lower-limit value are set for each peak.

Also, the number of subdivisions of the above-described details is an example, and the number of subdivisions may be N×2+1 or more when the number of peaks is set to N.

The pixel value distribution calculation unit configured to perform such processing can reliably exclude a pixel value range with a small number of pixels from a valid pixel range.

What is claimed is:

1. A correlation value calculation device for calculating a correlation value between a base block within an image and at least one reference block within the image or other image, the correlation value calculation device comprising:
   a pixel value distribution calculation unit configured to calculate a pixel value distribution of pixels within the image and select a range of pixel values of a large number of pixels as a valid pixel value range;
   a conversion coefficient calculation unit configured to calculate conversion coefficients for converting pixels of the valid pixel value range into a prescribed bit-depth; and
   a pixel value conversion unit configured to perform a bit-depth reduction process on pixels within the base block and pixels within the reference block on the basis of the conversion coefficients,
   wherein the pixel value distribution calculation unit is configured to select the valid pixel value range by excluding a prescribed number of pixels in order from a pixel having a largest pixel value or excluding a prescribed number of pixels in order from a pixel having a smallest pixel value on the basis of the calculated pixel value distribution, and
   wherein the pixel value distribution calculation emit is configured to determine the number of pixels to be excluded, from the valid pixel value range on the basis of a noise occurrence rate estimated from photographing conditions of the image.

2. The correlation value calculation device according to claim 1, wherein the pixel value distribution calculation unit is configured to calculate a pixel value distribution for each element and is configured to select a valid pixel value range for each element when one pixel of the image includes a plurality of elements.

3. The correlation value calculation device according to claim 1, wherein the pixel value distribution calculation unit is configured to select a range of pixel values of a large number of pixels as the valid pixel value range on the basis of positions of peaks in the number of pixels and the number of peaks in the calculated pixel value distribution.

4. The correlation value calculation device according to claim 1, wherein the pixel value distribution calculation unit is configured to calculate the pixel value distribution of only pixels within the base block within the image.

5. The correlation value calculation device according to claim 1, wherein the pixel value distribution calculation unit is configured to calculate the pixel value distribution of pixels within both the base block and the reference block.

* * * * *